US012620397B2

(12) United States Patent
Fassnacht

(10) Patent No.: US 12,620,397 B2
(45) Date of Patent: May 5, 2026

(54) SYSTEMS AND METHODS FOR PERFORMING LIVE TRANSCRIPTION

(71) Applicant: NBCUniversal Media, LLC, New York, NY (US)

(72) Inventor: Timothy Rolf Fassnacht, Morristown, NJ (US)

(73) Assignee: NBCUniversal Media LLC, New York, NY (US)

( * ) Notice: Subject to any disclaimer, the term of this patent is extended or adjusted under 35 U.S.C. 154(b) by 561 days.

(21) Appl. No.: 17/895,715

(22) Filed: Aug. 25, 2022

(65) Prior Publication Data

US 2024/0071387 A1     Feb. 29, 2024

(51) Int. Cl.
| | |
|---|---|
| *G10L 15/26* | (2006.01) |
| *G10L 15/30* | (2013.01) |
| *G10L 25/57* | (2013.01) |

(52) U.S. Cl.
CPC .............. *G10L 15/26* (2013.01); *G10L 15/30* (2013.01); *G10L 25/57* (2013.01)

(58) Field of Classification Search
CPC .......... G10L 15/26; G10L 15/30; G10L 25/57
See application file for complete search history.

(56) References Cited

U.S. PATENT DOCUMENTS

| | | | | |
|---|---|---|---|---|
| 9,633,696 B1 * | 4/2017 | Miller | .................. | G11B 27/031 |
| 2011/0145348 A1 * | 6/2011 | Wei | ..................... | G06F 16/7844 |
| | | | | 709/231 |
| 2011/0145428 A1 * | 6/2011 | Wei | ..................... | G06F 16/7844 |
| | | | | 707/769 |
| 2020/0169591 A1 * | 5/2020 | Ingel | ....................... | G10L 13/08 |
| 2020/0302934 A1 * | 9/2020 | Peters | .................... | G10L 15/30 |

* cited by examiner

*Primary Examiner* — Richemond Dorvil
*Assistant Examiner* — Ethan Daniel Kim
(74) *Attorney, Agent, or Firm* — Fletcher Yoder, P.C.

(57)     ABSTRACT

The present disclosure is generally directed to a tangible, non-transitory machine-readable medium that includes machine-readable instructions that, when executed, cause processing circuitry to receive a first indication of multimedia content and a second indication of whether the multimedia content is to be transcribed. The instructions cause the processing circuitry to send content generated from the multimedia content for transcription. The content includes an identifier associated with the multimedia content. Additionally, the instructions cause the processing circuitry to send a request for the content to be transcribed. The request includes or is indicative of the identifier. Moreover, the instructions cause the processing circuitry to receive a transcript for at least a portion of the content and generate transcript metadata that includes timing data and is indicative of text of the transcript. Lastly, the instructions cause the processing circuitry to send the transcript metadata to be combined with the multimedia content.

18 Claims, 5 Drawing Sheets

SYSTEMS AND METHODS FOR PERFORMING LIVE TRANSCRIPTION

BACKGROUND

The present disclosure relates generally to the transcribing multimedia content. More particularly, the present disclosure relates to performing transcription of multimedia content, such as video content, in a live (e.g., real-time or near real-time) manner.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Multimedia content may be associated with text. For example, video content may include spoken words. The spoken words may be reflected in text form, such as a transcript. In some cases, transcription may be performed manually (e.g., by a human being) as content is prepared or broadcast. However, in some cases, transcription may not be performable simultaneously or in a near-simultaneous manner. Moreover, while machine-learning or artificial intelligence (AI) techniques may be used to transcribe spoken words in content, such techniques may appear unadaptable to performing real-time or near-real time transcription of live multimedia content, for example, due to being performed by systems (e.g., computing systems) that are separate from systems used to broadcast or disseminate multimedia content.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The current embodiments relate to systems and methods for providing real-time or near real-time transcription of multimedia content, such as video content. Additionally, as discussed below, the techniques provided herein enable text to be temporally aligned with content so that the text (e.g., from a transcription) matches spoken words or other audio content included in the transcribed content. As also described below, the techniques described herein may be scaled to enable simultaneous transcription to occur in several different locations while a central management module may track and provide the status of the transcriptions being performed.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, multimedia content may be associated with text. For example, video content may include spoken words. The spoken words may be reflected in text form, such as a transcript. In some cases, transcription may be performed manually (e.g., by a human being) as content is prepared or broadcast. However, in some cases, transcription may not be performable simultaneously or in a near-simultaneous manner. Moreover, while machine-learning or artificial intelligence (AI) techniques may be used to transcribe spoken words in content, such techniques may appear unadaptable to performing real-time or near-real time transcription of live multimedia content, for example, due to being performed by systems (e.g., computing systems) that are separate from systems used to broadcast or disseminate multimedia content. Accordingly, there exists an opportunity for performing transcriptions of live multimedia content in real-time or near real-time (e.g., time delayed by a few seconds). As described herein, the presently disclosed techniques enable multimedia content, such as videos, to be transcribed in a real-time or near real-time manner. Additionally, as discussed below, the techniques provided herein enable text to be temporally aligned with content so that the text (e.g., from a transcription) matches spoken words or other audio content included in the transcribed content. As also described, the techniques described herein may be scaled to enable simultaneous transcription to occur in several different locations while a central management module may track and provide the status of the transcriptions being performed.

Figure 1:
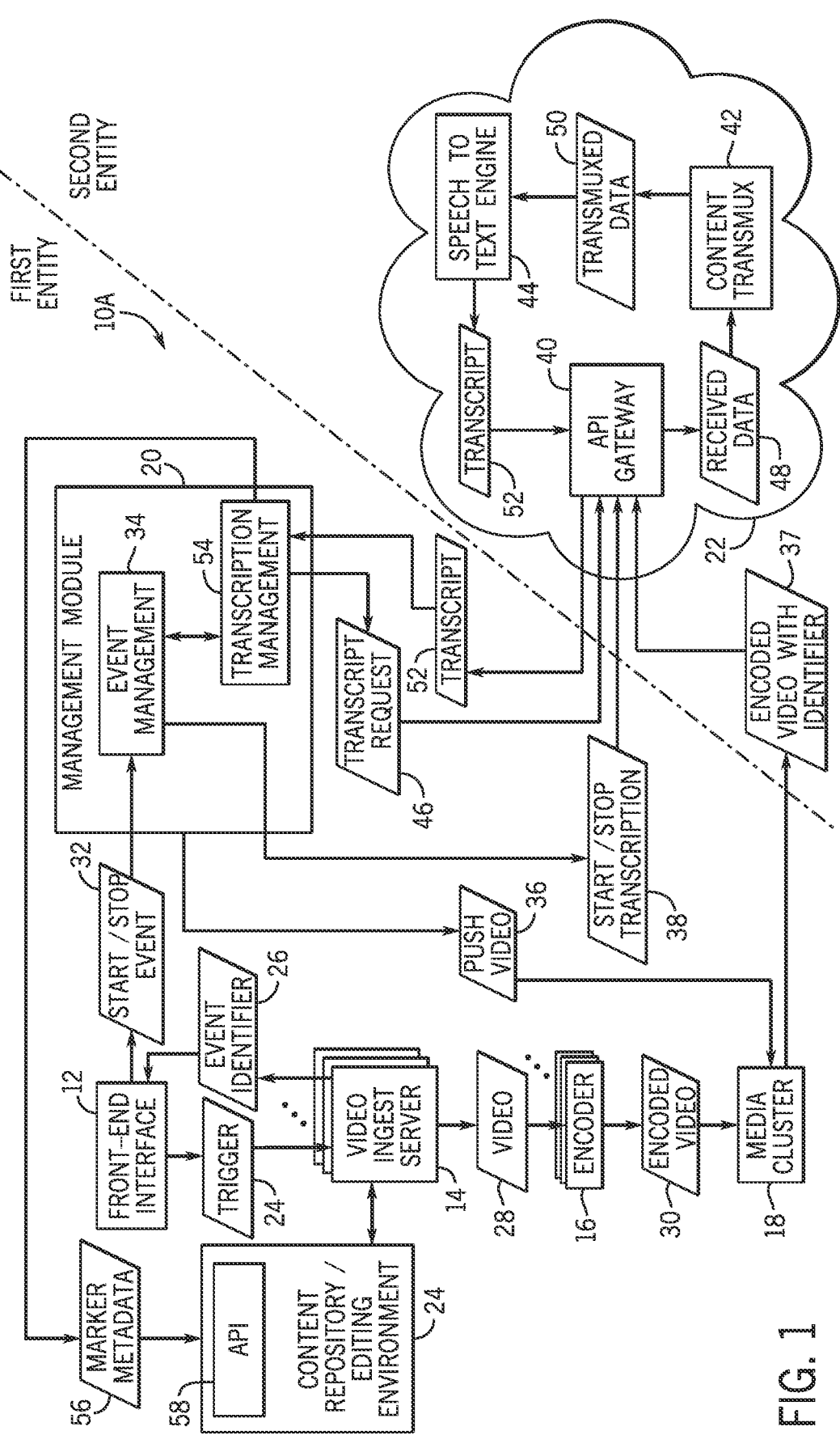
FIG. 1 is a block diagram of a transcription system, in accordance with an embodiment of the present disclosure.

Turning now to a more detailed discussion of transcribing content such as video content, FIG. 1 is a block diagram of a transcription system 10A. As illustrated, the transcription system 10A may include a front-end interface 12, one or more video ingest servers 14, one or more encoders 16, a media cluster 18, a management module 20, a cloud-based system 22, and a content repository and editing environment 24. As indicated by "first entity" and "second entity," in some embodiments, the front-end interface 12, one or more video ingest servers 14, one or more encoders 16, media cluster 18, management module 20, and the content repository and editing environment 24 may be owned and/or controlled by one entity (e.g., a first entity such as a business or person), while the cloud-based system 22 may be owned and/or controlled by another entity (e.g., a second entity). For example, the first entity may be a person or company that generates and/or broadcasts or streams video content, while the second entity may be a different person or company. Furthermore, the components of the transcription system 10A associated with the first entity may be communicatively coupled to one another via a network, such as a local area network (LAN) or a wireless local area network (WLAN). It should be noted though, that in other embodiments, the transcription system 10A may be owned and/or controlled by one entity, such as the first entity.

The front-end interface 12, the one or more video ingest servers 14, the one or more encoders 16, the media cluster 18, the management module 20, the content repository and editing environment 24, and the cloud-based system 22 may be one or more computing devices that may include 1) memory and/or storage devices (e.g., non-transitory computer-readable media) that may store machine-readable instructions and 2) processing circuitry (e.g., one or more processors) that may execute the machine-readable instructions perform the operations described herein. Additionally, front-end interface 12, the one or more video ingest servers 14, the one or more encoders 16, the media cluster 18, the management module 20, the content repository and editing environment 24, and the cloud-based system 22 may be implemented by one or more computing devices that may include processing circuitry (e.g., one or more processors) that execute machine-readable instructions to perform the operations described herein. Accordingly, the components of the transcription system 10A may be implemented physically, in software, or some combination thereof. As discussed below, the components of the transcription system 10A may generate transcribed multimedia content (e.g., video content). Furthermore, while the cloud-based system 22 may be implemented using a cloud-based architecture, in other embodiments, other computing systems may be utilized. As such, the cloud-based system 22 is not limited to being implemented using cloud-computing techniques.

The front-end interface 12 may be a user interface provided on one or more computing devices that a user may interact with to schedule actions related to content to be recorded (e.g., a live stream or feed of video data) or already recorded content (e.g., a pre-recorded video). In other words, the front-end interface 12 may be a user interface of scheduling software that a user may utilize to schedule actions to be performed on content that is being recorded or that has been recorded. One example of such an action is the transcription of multimedia content. Accordingly, a user may interact with the front-end interface 12 to request multimedia content to be transcribed. In response to receiving such a request, the front-end interface 12 (or the computing device that provides the front-end interface 12) may generate and send a trigger 24 to the video ingest server 14. The trigger 24 may be data or a command to cause a recording (e.g., live, near-live, or previously recorded video content) to be transcribed. As will be described below, the trigger 24 (or an event associated with the trigger 24 (e.g., transcribing a particular clip of video content)) may be associated with metadata related to the content to be transcribed.

The video ingest server 14 may receive multimedia content, such as video content, and generate multimedia files that may be stored in the content repository and editing environment 24. More specifically, and the video ingest server 14 may receive the multimedia content (or portions thereof) from one or more content sources (e.g., video feeds or streams), and the content repository and editing environment 24 may include video data that has been previously recorded or is being recorded (e.g. live content) for multiple channels of multimedia content (e.g., television channels, streams or streaming services of multimedia content provided via the Internet, or a combination thereof). When a clip of video content—which may be an entire video or a portion thereof—is to be transcribed, the video ingest server 14 may generate an event identifier 26 that is indicative of the event of transcribing the clip. In other words, the trigger 24 may cause a transcription to be performed, the transcription may be referred to as an event, and the event may be identified by the event identifier 26. The event identifier 26, which may also be referred to as a "stream identifier," may be an identifier or metadata that is unique to each particular transcription. Thus, each transcription performed by the transcription system 10A may have its own event identifier 26. Furthermore, the video ingest server 14 may send the event identifier 26 to the front-end interface (or the computing device that provides the front-end interface 12), which in turn may provide the event identifier 26 (or data that include the event identifier 26) to the management module 20.

The video ingest server 14 may also send multimedia content to one or more of the encoders 16 to be encoded. For example, the video ingest server 14 may send video data 28, which may be a clip that is to be transcribed, to the encoders 16. While the video data 28 is described here with respect to FIG. 1, it should be noted that the transcription system 10A (nor any transcription system discussed herein) is not limited to transcribing video content and that, in other embodiments, other forms of multimedia content may be transcribed instead of the video data 28. The encoders 16 may encode the video data 28 using any suitable encoding technique to generate encoded video data 30, which the encoders 16 may send to the media cluster 18. More specifically, the encoders 16 may be real-time messaging protocol (RTMP) encoders that may send the encoded video data 30 in accordance with RTMP.

The media cluster 18 may store encoded video content received from the encoders 16, such as the encoded video data 30. As the encoders 16 may generate encoded video data for any video content (e.g., video content from several, dozens, or hundreds of content channels), the media cluster 18 may serve as an aggregator for any encoded multimedia content generated by the encoders 16 and is not limited to storing only content that will be transcribed. As discussed below, the management module 20 may cause the media cluster 18 to be send encoded multimedia content to the cloud-based system 22 to be transcribed.

The management module 20 may be implemented as machine-readable instructions that are executable by processing circuitry of one or more computing devices (e.g., a server). The management module 20 may receive, from the front-end interface 12, data regarding each piece of content to be recorded. In other words, for any content scheduled at the front-end interface 12 (regardless of whether the content is to be transcribed), the front-end interface 12 may provide data regarding the content to the management module 20. In the context of FIG. 1, this data may be start/stop event data 32. More specifically, the start/stop event data 32 may include data (or metadata) indicating whether content (e.g., a video) is to be transcribed, a channel identifier associated with the content, the event identifier 26 (or data indicative of the channel identifier), a name of the content, an identifier of the content, one or more people involved in the production of the content and their titles (e.g., director, producer, etc.), and a start/stop timecode. The start/stop timecode may be indicative of a start time and an end time that respectively indicate points of time within the content when transcription should begin and end.

Using the start/stop event data 32, an event management module 34 of the management module 20 may determine whether to transcribe content. For example, when the start/stop event data 32 is indicative that content (e.g., a video) is to be transcribed, the event management module 34 may cause the content to be transcribed. In particular, the event management module 34 may associate the event identifier 26 with the channel identifier for the content to be transcribed and generate and send a push video command 36 (e.g., an application programming interface (API) call) to the media cluster 18. The push video command 36 may indicate which particular content (e.g., video clip stored in the media cluster 18) is to be transcribed. For example, as noted above, the media cluster 18 may aggregate content for multiple channels. The push video command 36 may indicate which channel and what specific content (e.g., by including the event identifier 26 and/or channel identifier in the push video command 36) is to be transcribed. In response to receiving the push video command 36, the media cluster 18 may generate modified video data 37, which may be the encoded video data 30 that has been combined with the event identifier 26. The media cluster 18 may also send the modified video data 37 to the cloud-based system 22 to be transcribed. In some embodiments, the media cluster 18 may encrypt the modified video data 37. In this manner, content provided to the cloud-based system 22 (e.g., to another entity, potentially via the Internet) may be more securely transported.

In addition to sending the push video command 36 to the media cluster 18, the event management module 34 may also send a start/stop transcription request 38 to the cloud-based system 22 (e.g., via an API call). In the case of initiating a transcription, the start/stop transcription request 38 indicates a transcription should begin, and the start/stop transcription request 38 may include the event identifier 26. Accordingly, the cloud-based system 22 may begin to perform a transcription and while having an indication of what the particular content to be transcribed is (e.g., as indicated by the event identifier 26). As discussed further below, the start/stop transcription request 38 may also be sent to end transcription.

The cloud-based system 22 may include an API gateway 40, a content transmux module 42, and a speech to text engine 44. The API gateway 40 may facilitate communication between the cloud-based system 22 and other components of the transcription system 10A, such as the media cluster 18 and the management module 20. For instance, the API gateway 40 may receive incoming data (e.g., the modified video data 37) and requests (e.g., the start/stop transcription request 38 and a transcript request 46 described below) and send received data 48 (e.g., received video content) to the content transmux module 42. The API gateway 40 may also send outgoing data or communications (e.g., transcripts) to components of the transcription system 10A such as the management module 20.

The content transmux module 42 may transmux the received data 48, for instance, to generate audio data from received video content. Thus, the content transmux module 42 may generate transmuxed data 50, which may be an audio file or audio data that will be transcribed. In one embodiment, the transmuxed data 50 may include only voice data. For example, other types of audio (which may be specified or characterized in received video content) may be disregarded so that a transcription is performed solely on spoken audio content. The content transmux module 42 sends the transmuxed data 50 to the speech to text engine 44. It should also be noted that the API gateway 40 and/or the content transmux module 42 may decrypt encrypted content received from the media cluster 18.

The speech to text engine 44 may be implemented fully or partially using machine-learning or artificial intelligence. In particular, the speech to text engine 44 may generate a transcript 52 that includes text data indicative of the spoken words in the transmuxed data 50 (and, therefore, content received by the cloud-based system 22). As mentioned above, the API gateway 40 may send the transcript 52 to the management module 20, or, more specifically, to a transcription management module 54 of the management module 20. In some embodiments, the cloud-based system 22 may encrypt the transcripts 52 provided to the management module 20, in which case the management module 20 may decrypt the received transcripts 52. The transcripts 52 may include the event identifier 26. As such, the management module 20 may identify which content a particular received transcript 52 is for based on the event identifier 26. In some embodiments, the transcripts 52 may also include time information (e.g., a time stamp) that may indicate an interval of time within the content (e.g., live content) to which the transcript 52 pertains.

As content is transcribed, the transcription management module 54 receives transcripts 52 generated by the speech to text engine 44. It should be noted that a single transcript 52 may only include text data for a portion of a clip or video segment to be transcribed. Accordingly, the entire text for a particular video segment may be included in several transcripts 52. For example, after the start/stop transcription request 38 has been sent to start a transcription for particular content, the transcription management module 54 may send a transcript request 46 to the cloud-based system 22 to request the transcript 52 for the content. More specifically, the transcript request 46 may identify the content by the event identifier 26, and, in response to receiving the transcript request 46, the cloud-based system 22 may provide the transcript 52, which (as noted above) may be an incomplete transcription for the content. For example, each transcript 52 may be for a particular interval or amount of time (in which case the last transcript 52 may be for a different (e.g., smaller amount of time)) such as three or five seconds, though any other suitable amount of time may be utilized.

As the transcription management module 54 receives transcripts 52, the transcription management module 54 may generate marker metadata 56 and send the marker metadata 56 to the content repository and editing environment 24 (e.g., via an API 58 of the content repository and editing environment 24). The marker metadata 56 may include a transcript 52 or the text of a transcript 52. Additionally, the marker metadata 56 may include timing data which indicates a particular frame or time (e.g., an atomic clock based time) that may be synchronized across the components of the transcription system 10A and have a desired accuracy and/or precision. In one embodiment, the time may be accurate to the millisecond (i.e., to the thousandths place or 0.001 second).

To temporally align transcriptions with multimedia content, the management module 20 may track time that passes between when a transcription of content is requested (e.g., as indicated by the start/stop event data 32) and when the corresponding transcript 52 is received. In other words, the management module 20 may account for the time passes while content is being transcribed. Based on the time difference (e.g., between when a transcript is requested and the transcript 52 is received), the transcription management module 54 may generate the timing data that is included in the marker metadata 56. Upon receiving the marker metadata 56, the content repository and editing environment 24 may append the marker metadata 56 to content (e.g., the video). Because the marker metadata 56 may indicate a particular frame of the content or a time (e.g., a particular millisecond) within the content, the text of the transcript will be temporally aligned with the audio data (e.g., spoken words) of the content.

In this manner, content may continue to be sent to the cloud-based system 22 for transcription, and the management module 20 may continue to request and receive transcripts 52, generate marker metadata 56, and provide the marker metadata 56 to the content repository and editing environment 24. Thus, transcription of content may occur on a repeated basis until transcription is to end, for example, because the content has been fully transcribed or because an indication to stop transcription has been received. For example, the management module 20 may determine that content has been fully transcribed when transcripts 52 have been received that include text for an entire runtime of the content (e.g., a video in the video data 28) to be transcribed. Additionally, the front-end interface 12 may send start/stop event data 32 to stop transcription. In response to either case, the event management module 34 may send a request (as represented by the start/stop transcription request 38) to the cloud-based system 22 to stop transcription of the video data 28. Furthermore, the transcription management module 54 may send a transcript request to obtain the transcript 52, for instance, for the end of the video data 28 of the last portion of content that is transcribed.

As content is actively being generated or recorded, the transcription system 10A may generate a transcription (e.g., the transcript 52) and associate the transcription (e.g., as metadata) with the content within seconds of the content being generated. Accordingly, the transcription system 10A may transcribe live multimedia content in real-time or in a near real-time manner.

Figure 2:
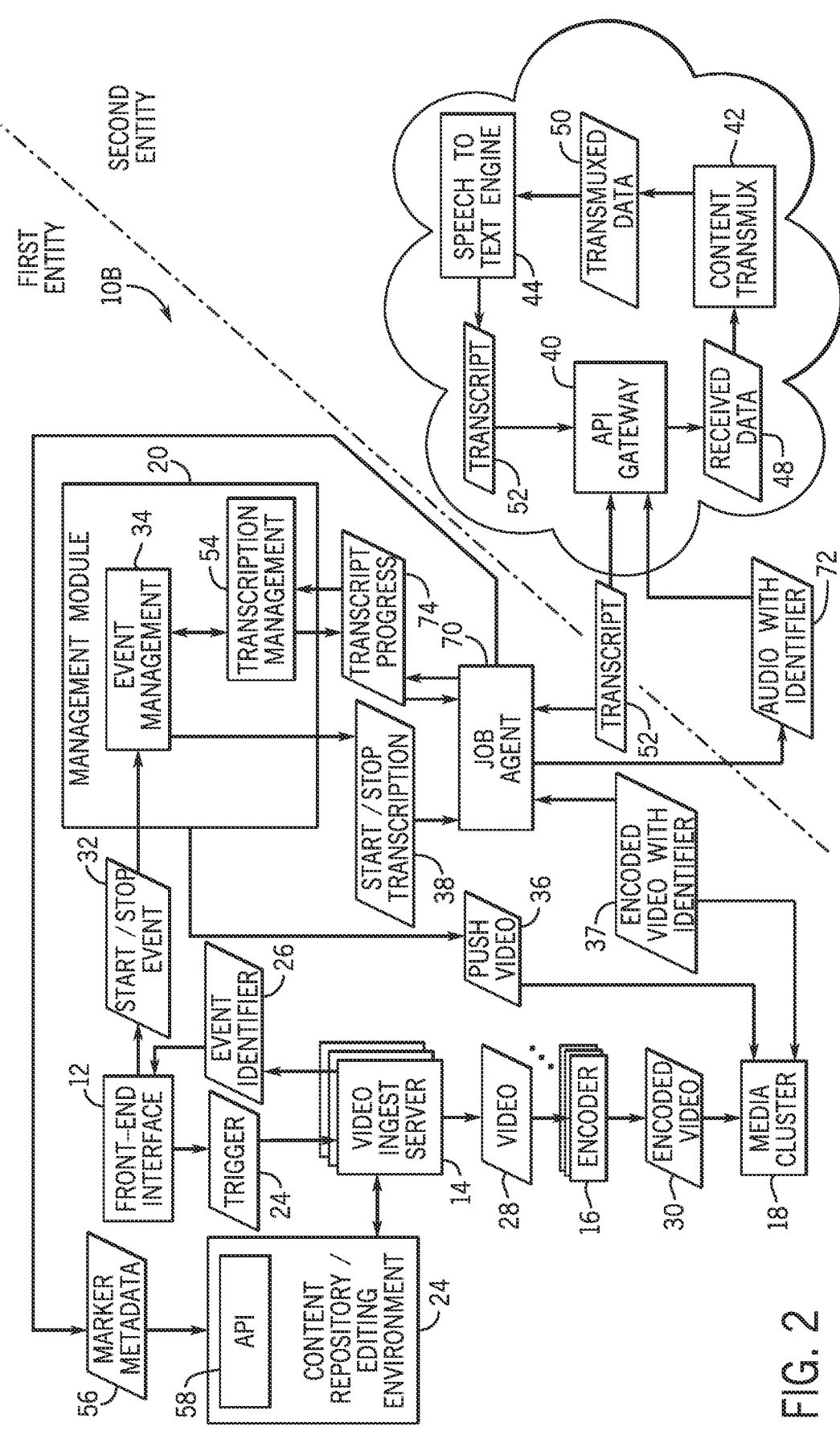
FIG. 2 is a block diagram of another transcription system, in accordance with an embodiment of the present disclosure.

FIG. 2 is a block diagram of a transcription system 10B that may transcribe multimedia content such as video. As illustrated, the transcription system 10B includes several of the same components as the transcription system 10A. Such components may function similarly in the transcription system 10B as described above with respect to the transcription system 10A. Accordingly, the discussion of the transcription system 10B below focuses on components and functions that differ from those of the transcription system 10A. With that said, it should be noted that either of the transcription system 10A and the transcription system 10B may be utilized to transcribe multimedia content.

The transcription system 10B may include one or more job agents 70, which may be implemented by processing circuitry of a computing device executing computer-readable instructions for the job agent 70. In other words, the job agent 70 may be implemented in software. In one embodiment, the job agent 70 may be implemented as a virtual machine. The computing device that implements the job agent 70 may be owned and/or controlled by the first entity and be the same or a different computing device than the computing device that implemented the management module 20. It should also be noted that, as with the transcription system 10A, in some embodiments, the transcription system 10B may be implemented by a single entity.

The job agent 70 may perform several functions related to transcription. For example, the job agent 70 may receive the modified video data 37 from the media cluster 18 and generate audio data 72 that includes the event identifier 26 or data or metadata indicative of the event identifier 26. The job agent 70 may send the audio data to the cloud-based system 22. It should be noted that the job agent 70 may also encrypt the audio data 72 prior to sending the audio data 72 to the cloud-based system. Relative to the modified video data 37, by sending the audio data 72 in an encrypted form, less data may be sent to the cloud-based system, thereby improving latency and using less communication and data processing bandwidth. Furthermore, because the audio data 72 may be encrypted, the audio data 72 may be securely transported between different entities. In embodiments in which the transcription system 10B is implemented by a single entity, the audio data 72 may not be encrypted.

The job agent 70 may also receive the start/stop transcription request 38 from the management module 20 and forward the start/stop transcription request 38 to the cloud-based system 22. Accordingly, the job agent 70 may send the content (e.g., the audio data 72) to be transcribed along with a request for the content to be transcribed.

The cloud-based system 22 may receive the start/stop transcription request 38 along with the audio data 72, decrypt the audio data 72, and transcribe the audio data 72 to generate the transcript 52. Because the cloud-based system 22 receives audio content, the audio data 72 may be provided directly to the speech to text engine 44. Furthermore, in some embodiments, the cloud-based system 22 may not include the content transmux module 42 or generate transmuxed data 50. After the speech to text engine generates the transcript 52, the cloud-based system may provide the transcript 52 to the job agent 70. In some embodiments, the transcript 52 may be encrypted. In such embodiments, the job agent 70 may decrypt the received transcripts 52.

As content is transcribed, the job agent 70 may receive transcript progress requests 74 from the management module 20. The transcript progress requests 74 be sent by the transcription management module 54 to track the progress of a transcript 52. As the job agent 70 receives transcripts 52 from the cloud-based system 22, the job agent 70 may provide transcript progress data (also represented by "transcript progress" in FIG. 2) to the transcription management module 54. In this manner, the management module 20 may track the progress of the transcription of multimedia content.

The job agent 70 may receive transcripts 52 from the cloud-based system and generate the marker metadata 56 as described above with respect to FIG. 1. In other words, while in the transcription system 10A the management module 20 is described as generating the marker metadata 56, in the transcription system of FIG. 10B, the job agent 70 may generate the marker metadata 56 using the techniques described above.

Furthermore, as with the transcription system 10A, the transcription system 10B may continue to transcribe content (e.g., in batches) until transcription has been completed, in which case the front-end interface 12 may send start/stop event data 32 to stop transcription. In response, the event management module 34 may send a request (as represented by the start/stop transcription request 38) to the cloud-based system 22 via the job agent 70 to stop transcription of the content being transcribed.

Accordingly, as content is actively being generated or recorded, the transcription system 10B may generate a transcription (e.g., the transcript 52) and associate the transcription (e.g., as metadata) with the content within seconds of the content being generated. Therefore, the transcription system 10B may transcribe live multimedia content in real-time or in a near real-time manner.

Figure 3:
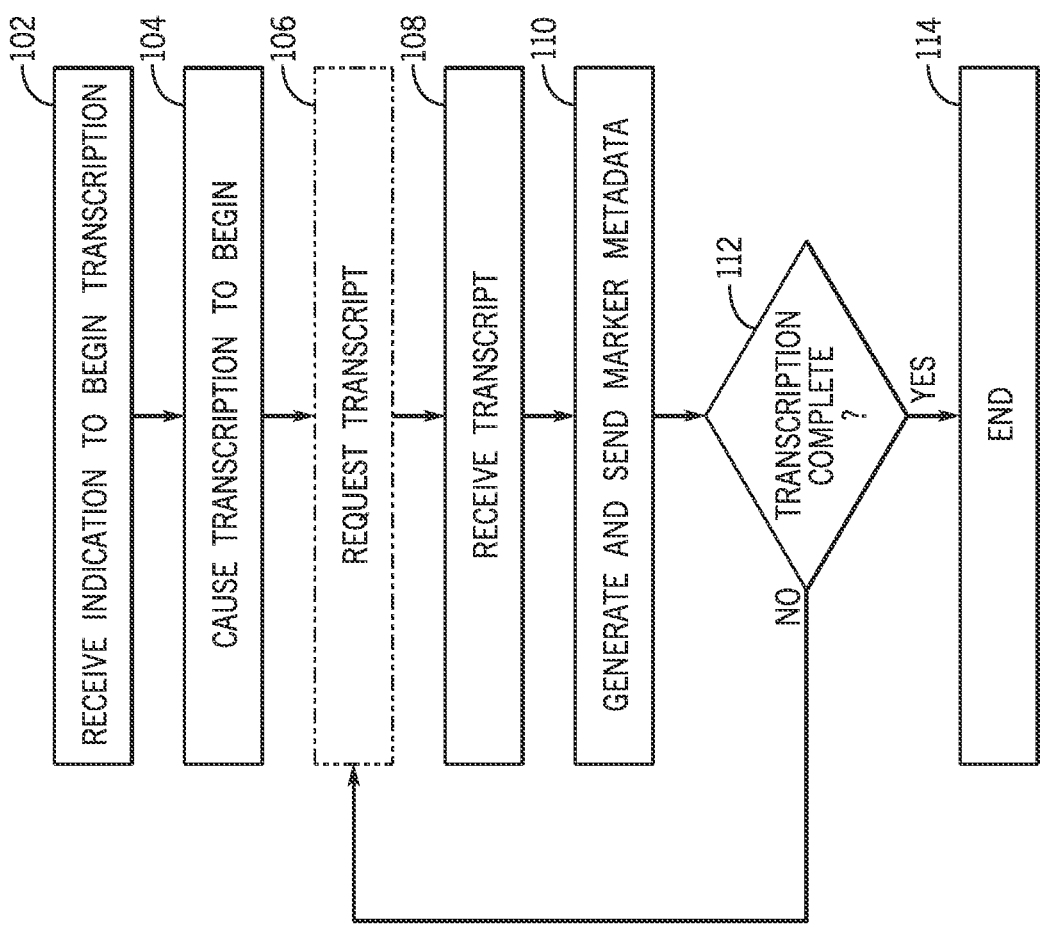
FIG. 3 is a flow diagram of an exemplary process for transcribing multimedia content, in accordance with an embodiment of the present disclosure.
Figure 3:

Bearing the discussion of FIG. 1 and FIG. 2 in mind, FIG. 3 is a flow diagram of a process 100 for transcribing multimedia content. In particular, the process 100 may be performed by the management module 20 of the transcription system 10A of FIG. 1 or the job agent 70 (alone or in combination with the management module 20) of the transcription system 10B of FIG. 2. As such, when the operations of the process 200 are described below, operations described as being performed by the management module 20 may be performed by the transcription system 10A, while operations described as being performed by the job agent 70/management module 20 may be performed by the transcription system 10B. Additionally, while the process 100 is described in one order below, it should be noted that, in other embodiments, the process 100 may be performed in a different order.

At process block 102, the management module 20 or the job agent 70 may receive an indication to begin transcription. For example, in the case of the management module 20, the indication may be the start/stop event data 32 that the management module 20 may receive from the front-end interface 12. Furthermore, in some cases, the management module 20 may determine that the start/stop event data 32 is indicative of a request to start transcription, for instance, based on the start/stop event data 32 indicating that a user has selected at the front-end interface 12 that particular content should be transcribed. In the case of the job agent 70, the job agent 70 may perform the operations associated with process block 102 by receiving the start/stop transcription request 38 from the management module 20.

At process block 104, the management module 20 or the job agent 70 may cause transcription to begin. For instance, the management module 20 may generate and send the start/stop transcription request 38 to the cloud-based system 22 to cause transcription to begin. Similarly, the job agent 70 may generate and send the start/stop transcription request 38 to the cloud-based system 22 to cause transcription to begin. Additionally, in the case of the job agent 70, the start/stop transcription request 38 may be sent with the audio data 72 to be transcribed.

At process block 106, the management module 20 or the job agent 70 may request a transcript from the cloud-based system 22. For example, as discussed above, as transcription is performed, the cloud-based system 22 may generate transcriptions for certain periods of time (e.g., seconds) of the content being transcribed, and the management module 20 may request the transcripts 52. It should be noted that process block 106 may not be performed in some embodiments.

At process block 108, the management module 20 or the job agent 70 may receive the transcript 52 generated by the cloud-based system 22. Furthermore, at process block 110, the management module 20 or the job agent 70 may generate marker metadata 56 and send the marker metadata 56 to the content repository and editing environment 24. As described above, the marker metadata 56 may be (text-based) metadata that can be applied to content maintained in the content repository and editing environment 24 such that when played, the transcripts (e.g., presented as subtitles or closed captioning) will be synchronized with the audio content of the content being played.

At decision block 112, the management module 20 or the job agent 70 may determine whether transcription is complete (or should end). In particular, the management module 20 may determine that transcription is complete based on receiving start/stop event data 32 indicative of there being no more content to transcribe. For example, in the context of live content and near-live (e.g., time delayed by a few seconds) content, the start/stop event data 32 may be indicative of a video feed ending or that a user has selected for transcription to end (e.g., at the front-end interface 12). Somewhat similarly, the job agent 70 may determine whether transcription is complete upon receiving the start/stop transcription request from the management module 20. If the management module 20 or the job agent 70 determines that the transcription is not complete, the process 200 may return to process block 106 (when performed) or process block 108, and transcription may continue to occur.

However, if at decision block 112 the management module 20 or the job agent 70 determines that the transcription is complete, at process block 114, the management module 20 or the job agent 70 may end the process 200 may end, for example, by sending the start/stop transcription request 38 to the cloud-based system to end transcription and/or by ceasing to send content (e.g., audio data 72) to the cloud-based system 22 for transcription. Additionally, at process block 114, the management module 20 or the job agent 70 may wait to receive a new indication to begin another transcription and return to process block 102 (to repeat the process 200) upon receiving the new indication. Before continuing with the drawings, it should be noted that the transcription system 10A and the transcription system 10B may perform multiple (e.g., a few, tens, hundreds) of iterations of the process simultaneously. Accordingly the transcription system 10A and the transcription system 10B may simultaneously generate transcripts for multiple pieces of content.

Figure 4:
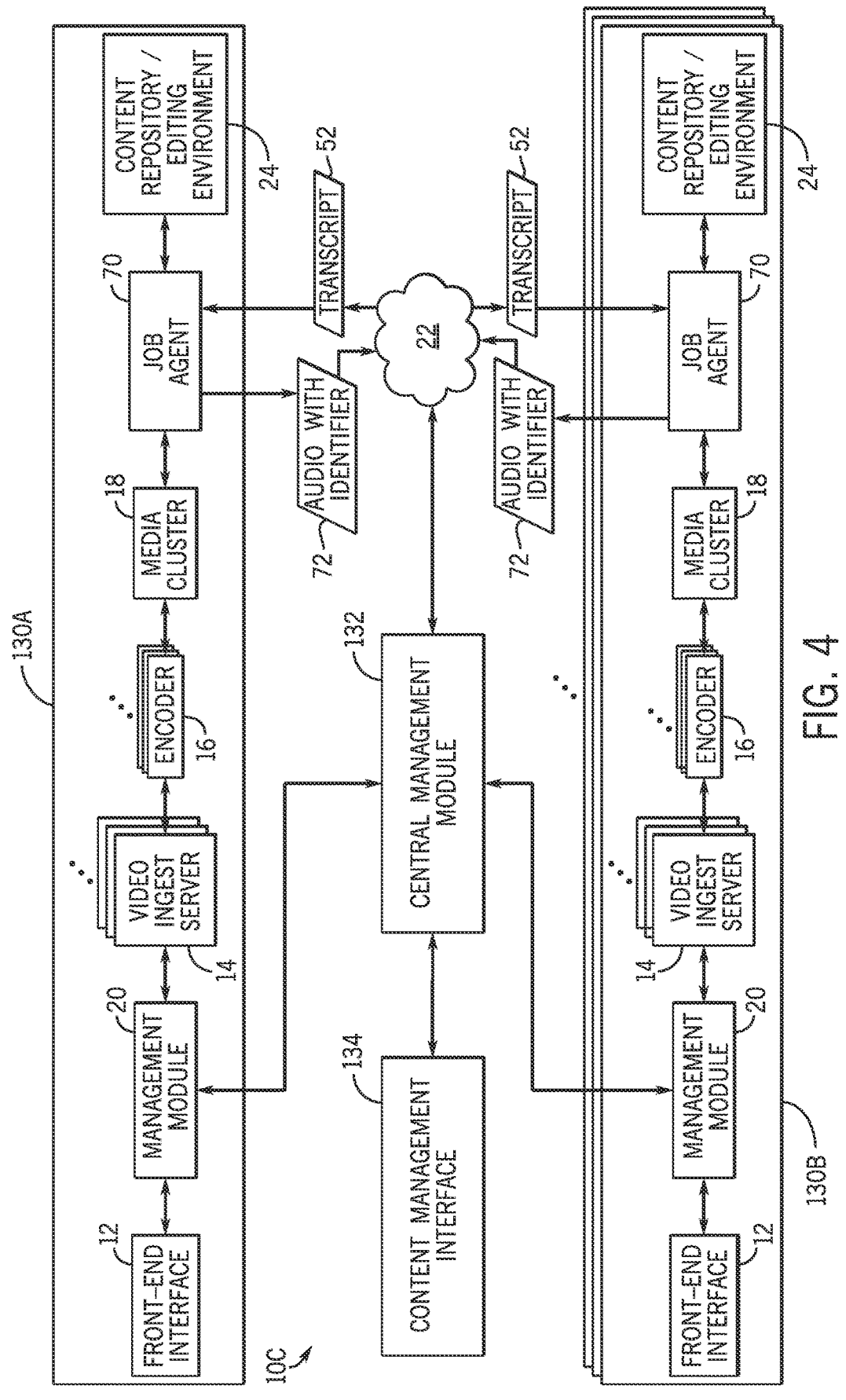
FIG. 4 is a block diagram of a yet another transcription system, in accordance with an embodiment of the present disclosure.

The techniques described above may be performed in multiple geographic locations simultaneously. For example, in the context of television content to be broadcast, video data may be captured in and processed at multiple locations, including different cities, countries, and continents. Bearing this in mind, FIG. 4 is a block diagram of a transcript system 10C that may perform transcription in multiple locations. In general, the transcript system 10C may be implemented by utilizing multiple components of the transcript system 10A or the transcript system 10B that may share a single cloud-based system (e.g., cloud-based system 22) that may be utilized for transcribing content. Thus, while the transcription system 10C is largely discussed below in the context of having multiple subsystems that are somewhat similar to the transcription system 10B (e.g., due to sharing similar components and because audio data is sent to the cloud-based system 22), in other embodiments, the subsystems may be implemented similarly to the transcription system 10A or a combination of the transcription system 10A and the transcription system 10B.

As illustrated, the transcription system 10C includes transcription subsystem 130A, transcription subsystem 130B, a central management module 132, the cloud-based system 22, and a content management interface 134. The transcription subsystems 130 (referring collectively to transcription subsystem 130A, transcription subsystem 130B) may be implemented by computing devices that have processing circuitry that can execute machine-readable instructions (e.g., stored on a non-transitory computer-readable medium) to perform the operations discussed herein. More specifically, each of the transcription subsystems may be implemented by computing devices that are physically located in, or associated with, a particular physical location (e.g., an address, a city, a state, a country). The cloud-based system 22 may be implemented as described above with respect to FIG. 1, and the central management module 132 may be implemented in a manner generally similar to the management module 20 discussed above. Additionally, the content management interface 134 may be implemented by a computing device that has processing circuitry can execute machine-readable instructions (e.g., stored on a non-transitory computer-readable medium) to perform the operations discussed herein. Moreover, it should be noted that the transcription system 10C may include any suitable number of transcription subsystems 130. Furthermore, in one embodiment, each component of the transcription system 10C may be owned or controlled by a single entity, whereas in other embodiments, each component of the transcription system 10C except for the cloud-based system 22 may be owned or controlled by one entity, while the cloud-based system 22 may be owned or controlled by another entity.

Each of the transcription subsystems 130 may include a front-end interface 12, management module 20, one or more video ingest servers 14, one or more encoders 16, a media cluster 18, a job agent 70, and a content repository and editing environment 24. The front-end interface 12, video ingest servers 14, encoders 16, media cluster 18, job agent 70, and the content repository and editing environment 24 may be implemented in and generally perform the same functions as described above. Indeed, the job agent 70 may send (encrypted) audio data 72 from multimedia content to the cloud-based system 22, and the cloud-based system # may transcribe the audio data 72, generate a transcript 52, and send the transcript 52 to the job agent 70. In turn, the job agent 70 may generate marker metadata (as discussed above) and provide the marker metadata to the content repository and editing environment 24.

The management module 20 of each of the transcription subsystems 130 may be communicatively coupled to the central management module 132. The management modules 20 may receive trigger data (e.g., the trigger 24 of FIG. 1 and FIG. 2) as well as event identifiers (e.g., the event identifier 26 of FIG. 1 and FIG. 2) and provide such data to the central management module 132. The central management module 132 may provide transcript requests to the cloud-based system 22 that are akin to the start/stop transcription requests 38 discussed above with respect to FIG. 1 and FIG. 2. Thus, the central management module 132 may request a transcription be performed, and the request may include an identifier that uniquely identifies the content to be transcribed. The central management module 132 may also send requests to the management modules 20 to check on the status of transcriptions, for instance, using the event identifier 26. Thus, the central management module 132 may maintain updatable records regarding the status of any transcription requests by the transcription subsystems 130.

Figure 5:
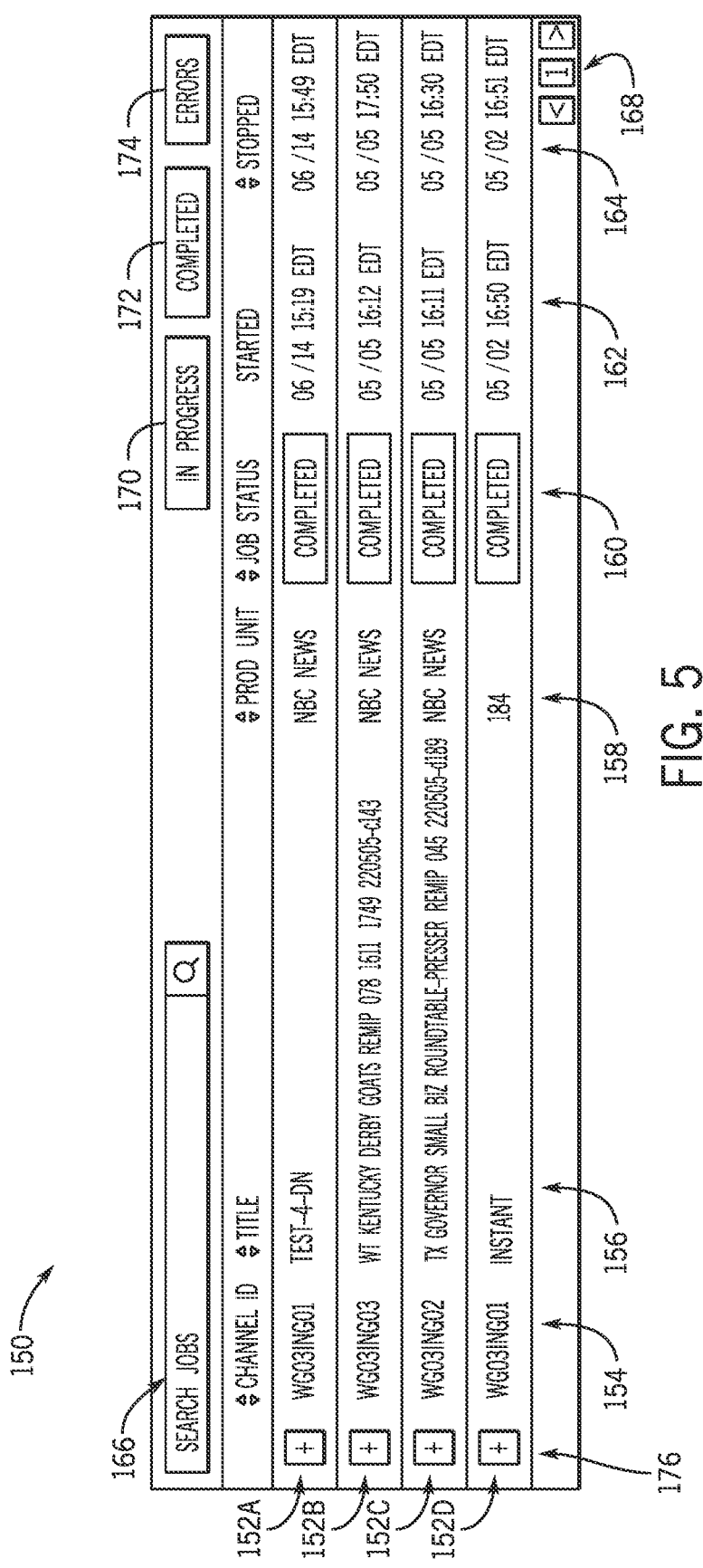
FIG. 5 is a user interface that may be provided by the content management interface of FIG. 4, in accordance with an embodiment of the present disclosure.

A user with access to the content management interface 134 may be presented with a user interface that presents the status of transcriptions across the transcription system 10C as well as other information regarding the transcriptions. For instance, FIG. 5 is a user interface (UI) 150 that may be presented via the content management interface 134. The UI 150 lists several transcriptions 152 (referring collectively to transcription 152A, transcription 152B, transcription 152C, and transcription 152D), which may be content for which transcripts that have been requested, for instance, by one or more of the transcription subsystems 130 of FIG. 4. Each of the transcriptions 152 may have a channel identifier 154, a title 156, a production unit 158 (e.g., an entity from which the content being transcribed originated or by which the content will be broadcast), a job status 160, a starting time 162 (e.g., when a transcription is requested or begins), and an ending time 164 (e.g., when a transcription finished). The transcriptions 152 are sortable based on these characteristics. The UI 150 also includes a search bar 166 that a user may utilize to search for transcriptions. Moreover, the UI 150 includes navigational UI items 168, which the user may interact with to navigate between pages of transcriptions. Furthermore, the UI 150 may include an in progress UI item 170, a completed UI item 172, and an error UI item 174, which when selected by a user, may respectively filter the transcriptions 152 so that only transcriptions currently being performed are displayed, completed transcriptions are displayed, or transcriptions during which errors occurred are displayed. In the case that more than one of the in progress UI item 170, a completed UI item 172, and an error UI item 174 are selected, the transcriptions having the job status 160 corresponding to the selected UI items will be displayed in the UI 150. Furthermore, each of the transcriptions 152 may include an expand GUI item 176, which when selected (e.g., as indicated by a user input), may provide additional information regarding the transcription. The additional information may include the event identifier 26 for the transcription 152, an identifier for the segment of the content to which the transcription 152 pertains, one or more people involved in the production of the content and their titles (e.g., director, producer, etc.), and a type of the content (e.g., live video feed, previously recorded). The additional information may include time information regarding when various operations associated with the transcription 152 or the content associated with the transcription 152 were performed. Examples of the time information may include when the content started being recorded, when the transcription 152 was requested, when the recording and sending the content for transcription ended, and when the transcription 152 was completed.

Returning briefly to FIG. 4, it should be noted that the transcription system 10C may perform the process 200. More specifically, the central management module 132 may perform the operations of the process 200 discussed above with respect to FIG. 3. As such, the transcription system 10C may be utilized to perform real-time or near real-time transcriptions at multiple locations simultaneously.

Accordingly, the presently disclosed techniques enable multimedia content, such as videos, to be transcribed in a real-time or near real-time manner. Additionally, as discussed above, the techniques provided herein enable text to be temporally aligned with content so that the text (e.g., from a transcription) matches spoken words or other audio content included in the transcribed content. As also described, the techniques described herein may be scaled to enable simultaneous transcription to occur in several different locations while a central management module may track and provide the status of the transcriptions being performed.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory machine-readable medium comprising machine-readable instructions that, when executed by one or more processors, cause the one or more processors to:

receive a first indication of live multimedia content and a second indication of whether the live multimedia content is to be transcribed;

cause content generated from the live multimedia content to be sent for live transcription, wherein the content comprises an event identifier associated with the live multimedia content;

send a request for the content to be transcribed, wherein the request comprises or is indicative of the event identifier;

receive a transcript for at least a first portion of the content, wherein the first portion is less than an entirety of the content;

generate, based on the transcript, transcript metadata that comprises timing data and is indicative of text of the transcript;

after receiving the transcript, determine whether live transcription of the live multimedia content is complete;

upon determining that the live transcription is not complete, receive a second transcript for a second portion of the content that differs from the first portion;

generate, based on the second transcript, second transcript metadata; and combine the transcript metadata and the second transcript metadata with the multimedia content.

2. The tangible, non-transitory machine-readable medium of claim 1, wherein the transcript comprises the event identifier.

3. The tangible, non-transitory machine-readable medium of claim 1, wherein the content generated from the live multimedia content is audio content.

4. The tangible, non-transitory machine-readable medium of claim 1, wherein the one or more processors are controlled by a first entity and live transcription of the content is performed by a second entity that is different than the first entity.

5. The tangible, non-transitory machine-readable medium of claim 1, wherein the instructions, when executed, cause the one or more processors to:

determine, based on the second indication that the live multimedia content is to be transcribed; and receive the event identifier prior to causing the content to be sent for live transcription.

6. The tangible, non-transitory machine-readable medium of claim 1, wherein the event identifier is indicative of the live transcription to be performed for the live multimedia content.

7. The tangible, non-transitory machine-readable medium of claim 1, wherein the instructions, when executed, cause the one or more processors to implement a virtual machine that is configured to receive the transcript and generate the transcript metadata.

8. The tangible, non-transitory machine-readable medium of claim 1, wherein the timing data:

is associated with an amount of time that passes between sending the request and receiving the transcript; and enables a computing device to associate the transcript metadata with the multimedia content in a synchronized manner.

9. A machine-implemented method for transcribing multimedia content, the method comprising:

receiving a first indication of live multimedia content comprising a live video feed and a second indication of whether the live multimedia content is to be transcribed;

sending content generated from the live multimedia content for live transcription, wherein the content comprises an event identifier associated with the live multimedia content;

sending a request for the content to be transcribed, wherein the request comprises or is indicative of the event identifier;

receiving a transcript for at least a first portion of the content, wherein the first portion is less than an entirety of the content;

generating, based on the transcript, transcript metadata that comprises timing data and is indicative of text of the transcript;

after receiving the transcript, determining whether live transcription of the live multimedia content is complete;

upon determining the live transcription is not complete, receiving a second transcript for a second portion of the content that differs from the first portion;

generating, based on the second transcript, second transcript metadata; and combining the transcript metadata and the second transcript metadata with the multimedia content.

10. The machine-implemented method of claim 9, comprising determining second timing data indicative of a time delay associated with generating and receiving the second transcript, wherein the second transcript metadata comprises the second timing data.

11. The machine-implemented method of claim 9, comprising transcribing the content using a machine-learning technique.

12. The machine-implemented method of claim 9, wherein the content generated from the live multimedia content comprises encoded video data.

13. The machine-implemented method of claim 12, comprising encrypting the encoded video data prior to sending the content for live transcription.

14. The machine-implemented method of claim 9, wherein the timing data:

is associated with an amount of time that passes between sending the request and receiving the transcript; and during playback of the multimedia content, enables the text of the transcript to be provided in a synchronized manner with audio data corresponding to the text.

15. A transcription system, comprising:

a central management module comprising one or more first processors, wherein the central management module is configured to send a request to a speech to text module for a transcription of live multimedia content to be completed, wherein the request comprises an event identifier associated with the transcription; and a plurality of transcription subsystems implemented at least partially by one or more second processors, wherein the plurality of transcription subsystems is configured to:

receive the live multimedia content;

generate the event identifier;

generate content from the live multimedia content, wherein the content comprises the event identifier;

send the content for transcription by the speech to text module;

receive a transcript for at least a first portion of the content, wherein the first portion is less than an entirety of the content;

generate, based on the transcript, transcript metadata that is indicative of text of the transcript and comprising timing data;

after receiving the transcript, determine whether live transcription of the live multimedia content is complete;

upon determining the live transcription is not complete, receive a second transcript for a second portion of the content that differs from the first portion;

generate, based on the second transcript, second transcript metadata; and combine the transcript metadata and the second transcript metadata with the multimedia content.

16. The transcription system of claim 15, wherein:

the central management module is controlled by a first entity; and the speech to text module is controlled by a second entity that is different than the first entity.

17. The transcription system of claim 15, comprising a content management interface implemented by one or more third processors, wherein the content management interface is configured to:

receive information regarding the transcription and a status of the transcription; and generate a user interface comprising the information regarding the transcription and the status of the transcription.

18. The transcription system of claim 15, wherein the content generated from the multimedia content is encoded video data, audio data, or a combination thereof.

\* \* \* \* \*